United States Patent
Shen et al.

(10) Patent No.: US 10,496,873 B2
(45) Date of Patent: Dec. 3, 2019

(54) BODY INFORMATION ANALYSIS APPARATUS AND METHOD OF DETECTING FACE SHAPE BY USING SAME

(71) Applicant: CAL-COMP BIG DATA, INC., New Taipei (TW)

(72) Inventors: Shyh-Yong Shen, New Taipei (TW); Min-Chang Chi, New Taipei (TW); Hui-Teng Lin, New Taipei (TW); Ching-Wei Wang, New Taipei (TW)

(73) Assignee: Cal-Comp Big Data, Inc., New Taipei (TW)

( * ) Notice: Subject to any disclaimer, the term of this patent is extended or adjusted under 35 U.S.C. 154(b) by 151 days.

(21) Appl. No.: 15/861,551

(22) Filed: Jan. 3, 2018

(65) Prior Publication Data

US 2019/0087642 A1 Mar. 21, 2019

(30) Foreign Application Priority Data

Sep. 18, 2017 (CN) .......................... 2017 1 0839948

(51) Int. Cl.
*G06K 9/62* (2006.01)
*G06K 9/00* (2006.01)
*G06K 9/22* (2006.01)

(52) U.S. Cl.
CPC ..... *G06K 9/00241* (2013.01); *G06K 9/00248* (2013.01); *G06K 9/00255* (2013.01); *G06K 9/00275* (2013.01); *G06K 9/22* (2013.01)

(58) Field of Classification Search
CPC ................. G06K 9/00221–2009/00328; A45D 2044/007; G06T 2207/30201
See application file for complete search history.

(56) References Cited

FOREIGN PATENT DOCUMENTS

| EP | 1589476 A1 | 10/2005 |
|----|------------|---------|
| WO | 2014037915 A1 | 3/2014 |

OTHER PUBLICATIONS

Wisuwat Sunhem, "An Approach to Face Shape Classification for Hairstyle Recommendation", 8th International Conference on Advanced Computational Intelligence Chiang Mai, Thailand; Feb. 14-16, 2016, 2016 IEEE, pp. 390-394. (Year: 2016).*
Search Report dated Jul. 6, 2018 of the corresponding European patent application.

* cited by examiner

*Primary Examiner* — Brian Werner
(74) *Attorney, Agent, or Firm* — Chun-Ming Shih; HDLS IPR Services

(57) ABSTRACT

A body information analysis apparatus and a method of detecting face shape by using same are provided. The apparatus includes an image fetching module; a display module; a processing unit including a face analysis module for positioning two eyebrows, a mouth and first features of a face contour in response to an identified face wherein the first features are at two sides of the face respectively; a first calculation module for calculating a vertical distance between the mouth and either eyebrow and taking same as a first distance, calculating a horizontal distance between the first features and taking same as a second distance, and calculating a first ratio of the first distance to the second distance; a face detection module for determining the face shape; and an information creation module.

15 Claims, 16 Drawing Sheets

BODY INFORMATION ANALYSIS APPARATUS AND METHOD OF DETECTING FACE SHAPE BY USING SAME

BACKGROUND OF THE INVENTION

1. Technical Field

The technical field relates to body information analysis apparatuses and methods, and more particularly relates to a body information analysis apparatus and a method of detecting face shape by using same.

2. Description of Related Art

Makeup is performed by women almost every day. Typically, an individual applies makeup to the body part by sitting in front of a mirror. Alternatively, the individual may applies makeup to the body part by viewing his or her image reflected from a screen of a mobile phone or a tablet computer. Also, the individual may select an appropriate manner of makeup based on his or her face shape (e.g., oval, circle or rhombus) prior to makeup. After finishing the makeup, the face of the individual may have an aesthetic appearance.

However, the true face shape of an individual can be confirmed only by using the eyes thereof. For an individual not having much experience in makeup may not be able to confirm his or her face shape or even make an erroneous determination.

Thus, the need for a body information analysis apparatus and a method of detecting face shape by using same exists.

SUMMARY OF THE INVENTION

The disclosure is directed to a body information analysis apparatus and a method of detecting face shape by using same so as to automatically detect the face shape of a user.

It is therefore a first object of the present disclosed example to, in one of the exemplary embodiments, provide a body information analysis apparatus, comprising an image fetching module for recording an image; a display module for showing information of a face shape; a processing unit electrically connected to both the image fetching module and the display module, and including a face analysis module for positioning two eyebrows, a mouth and two first features of a face contour in response to identifying a face in an image recorded by the image fetching module wherein the first features are disposed at two sides of the face respectively and have an elevation the same as that of the mouth in the face contour; a first calculation module for calculating a vertical distance between the mouth and either eyebrow and taking the vertical distance as a first distance, calculating a horizontal distance between the first features and taking the horizontal distance as a second distance, and calculating a first ratio of the first distance to the second distance; a face detection module for determining the face shape based on the first ratio; and an information creation module for creating information of a corresponding face shape based on the determined face shape.

It is a second object of the present disclosed example to, in one of the exemplary embodiments, provide a method of detecting face shape by using a body information analysis apparatus, comprising the steps of activating an image fetching module of the body information analysis apparatus to record an image; activating a processing unit of the body information analysis apparatus for positioning two eyebrows, a mouth and two first features of a face contour in response to identifying a face in an image recorded by the image fetching module wherein the first features are disposed at two sides of the face respectively and have an elevation the same as that of the mouth in the face contour; calculating a vertical distance between the mouth and either eyebrow and taking the vertical distance as a first distance, and calculating a horizontal distance between the first features and taking the horizontal distance as a second distance; calculating a first ratio of the first distance to the second distance; and determining the face shape based on the first ratio, and showing information of the determined face shape on a display module.

The present disclosed example has the following advantages and benefits in comparison with the conventional art: The present disclosed example is capable of automatically detecting the face shape of a user so that a user may take it as a reference for makeup and/or wear.

The above and other objects, features and advantages of the present disclosed example will become apparent from the following detailed description taken with the accompanying drawings.

DETAILED DESCRIPTION OF THE INVENTION

Embodiments of the present disclosed example will now be described, by way of example only, with reference to the accompanying drawings.

The present disclosed example discloses a body information analysis apparatus (hereinafter called analysis apparatus) 1 and a method of detecting face shape by using the analysis apparatus 1 (hereinafter called face shape detection method). The face shape detection method can detect face shape of a user and show the detected face shape on a screen of the analysis apparatus 1. Thus, the user may easily confirm his or her face shapes and take appropriate actions (e.g., makeup, wearing hat, sunglasses and/or earrings, and/or cutting hair) to alter his or her appearance.

Figure 1:
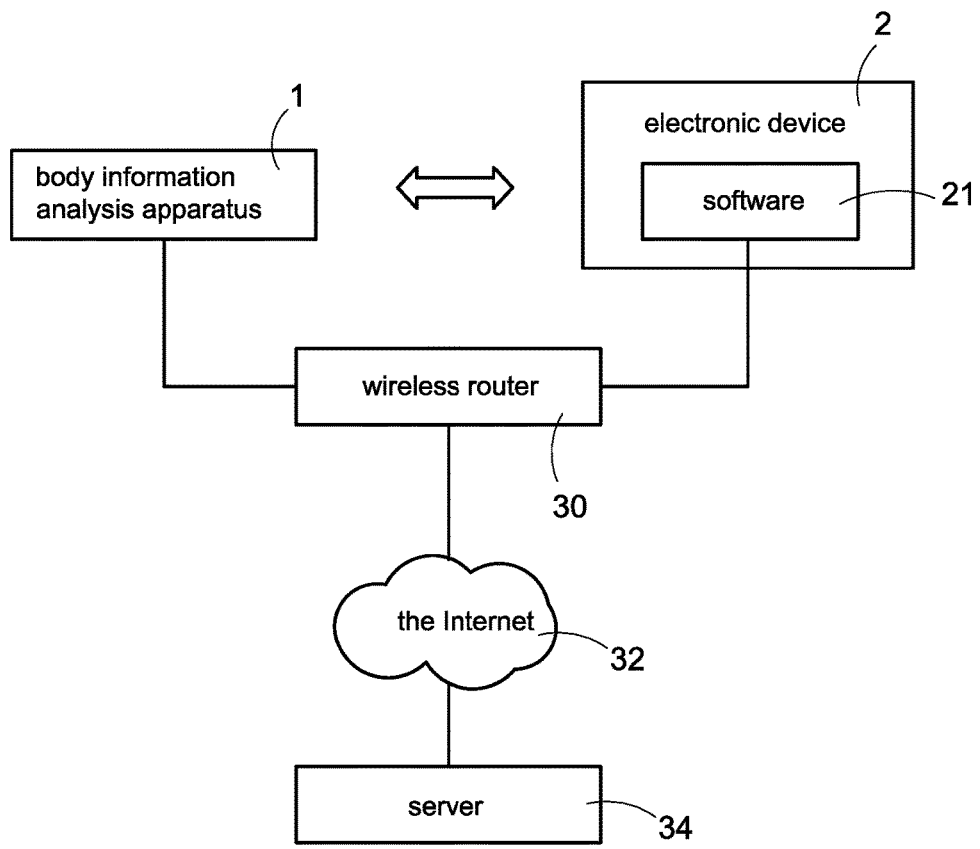
FIG. 1 is a block diagram of a system according to the present disclosed example.

Referring to FIG. 1, it is a block diagram of a system according to the present disclosed example. In an embodiment of FIG. 1, a user may operate an electronic device 2 to set the analysis apparatus 1. Specifically, software 21 is stored in memory (not shown) of the electronic device 2. The software 21 (e.g., application software developed by the manufacturer of the analysis apparatus 1) is adapted to control the electronic device 2. Also, a user can perform the software 21 to cause the analysis apparatus 1 to accept user input data, show images of the user (e.g., face images), and/or set various predetermined values.

In an embodiment, the user may directly operate an input interface (e.g., an input interface 15 of FIG. 4) of the analysis apparatus 1 for setting purposes.

In an embodiment, Wi-Fi, Bluetooth, Zigbee, radio frequency (RF), infrared, optical communication, audio communication and/or any of other wireless communication techniques can be employed by a wireless transmission module (e.g., a wireless transmission module 16 of FIG. 4) of the analysis apparatus 1 for data transfer between the analysis apparatus 1 and the electronic device 2.

In an embodiment, the analysis apparatus 1 is connected to a wireless router 30 of the same area. The wireless router 30 is connected to the Internet 32. Thus, the analysis apparatus 1 may update its firmware, perform uploading and perform downloading via the Internet 32. Further, the analysis apparatus 1 may transmit body information including external images, face images and/or face shape information (as detailed later) of the user to a remote server 34 via the Internet 32. Thus, the user may view from a remote location and the purpose of remote backup of information is obtained.

Figure 2:
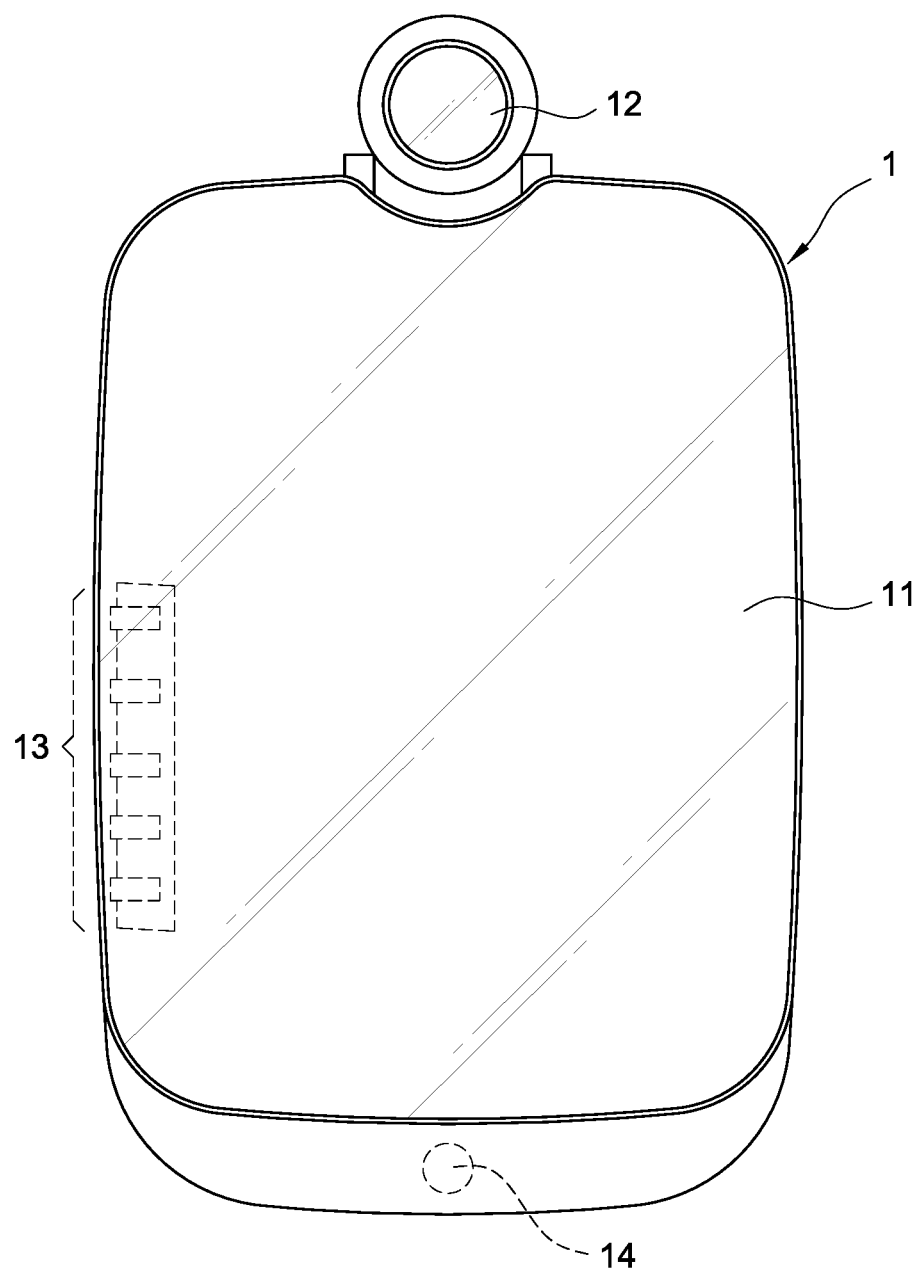
FIG. 2 is a top view of a body information analysis apparatus.
Figure 3:
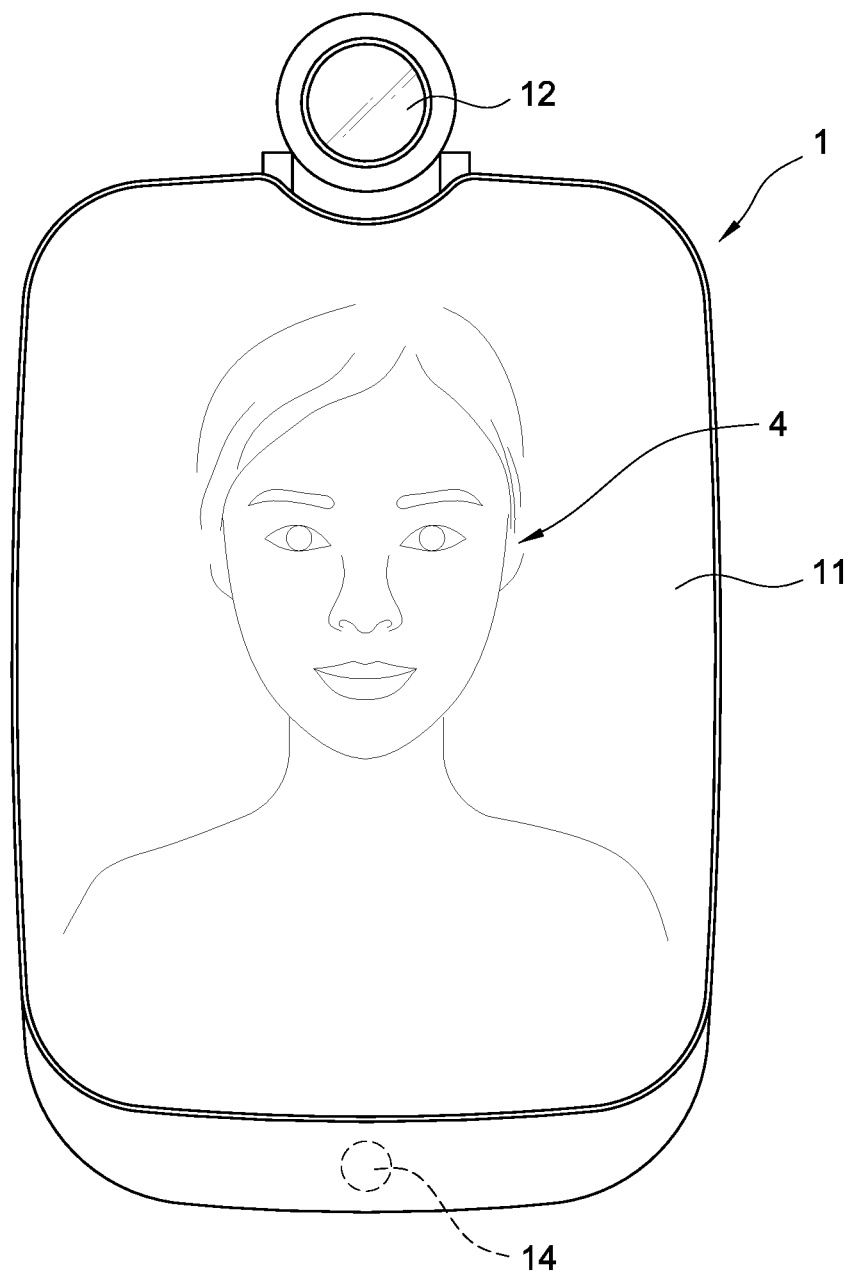
FIG. 3 is a view similar to FIG. 2 with an image shown thereon.

Referring to FIGS. 2 and 3 in which FIG. 2 is a top view of a body information analysis apparatus, and FIG. 3 is a view similar to FIG. 2 with an image shown thereon. In FIGS. 2 and 3, the analysis apparatus 1 is provided in a bedroom or bathroom so that a user may easily detect and analyze information of the body parts including the face, the neck, the hand and the skin.

The analysis apparatus 1 comprises a screen 11. After activating the analysis apparatus 1 (see FIG. 2), a graphical user interface (GUI) is shown on the screen 11 and the user may interact with the GUI. Further, after deactivating the analysis apparatus 1 (see FIG. 3), the screen 11 can be used as a mirror so that the user can see his or her image 4 in the screen 11.

The analysis apparatus 1 of the disclosed example is used to detect face shape of a user and show information of the detected face shape for alerting the user so that the user may apply appropriate makeup. As described above, the screen 11 can be used to show the GUI or the image 4 of the user, thereby enabling the user to analyze the face shape prior to applying makeup and providing help as discussed later.

In an embodiment, the analysis apparatus 1 further comprises an image fetching module 12. The image fetching module 12 is provided on the analysis apparatus 1 and is capable of adjusting its angle with respect to the analysis apparatus 1. In an embodiment, the image fetching module 12 can take a high resolution picture of the body part (e.g., the face, the neck or the hand) of the user and convert same into a digital image. The analysis apparatus 1 can analyze the body information and/or makeup progress by using the image. In another embodiment, the image fetching module 12 can fetch external information (e.g., one-dimensional (1D) barcode or two-dimensional (2D) barcode) for obtaining data therefrom.

Also, the analysis apparatus 1 sends the image obtained by the image fetching module 12 to the screen 11 for showing. Thus, the user can see his or her image 4 on the screen 11 when the analysis apparatus 1 is activated.

Further, the analysis apparatus 1 may process the image in real time by drawing face contours on the images or embedding text and graphics information and send the processed image to the screen 11 for showing.

Thus, the analysis apparatus 1 may provide additional information to the user by means of augmented reality (AR) so that the user may see his or her image on the screen 11 when applying makeup, thereby increasing extent of user experience.

In an embodiment, the screen 11 is implemented as a touchscreen and the user can give input through a simple gesture by touching the screen 11 with one or more fingers.

The analysis apparatus 1 further comprises a plurality of keys 13. In the embodiment, the keys 13 are implemented as buttons or touch keys in a non-limiting manner. The user may press the key 13 to operate the GUI (e.g., activating the GUI to return to homepage, previous page, or next page), or cause the analysis apparatus 1 to perform a corresponding function (e.g., activating the screen 11, deactivating the screen 11, or activating the image fetching module 12).

The analysis apparatus 1 further comprises one or more sensor (e.g., thermometer and hygrometer) 14 for sensing environment conditions of the analysis apparatus 1. By utilizing the analysis apparatus 1, accuracy of detection and analysis of the body image of the user can be greatly increased. In an embodiment, the sensor 14 is a motion sensor so that the analysis apparatus 1 may activate the motion sensor 14 to sense the gesture (e.g., moving leftward, moving rightward, moving upward, moving downward, moving forward, or moving rearward) of the user. In such a manner, the user may give input to the analysis apparatus 1 by a gesture without touching the screen 11 or pressing the key 13. This has the benefit of leaving no fingerprints.

Figure 4:
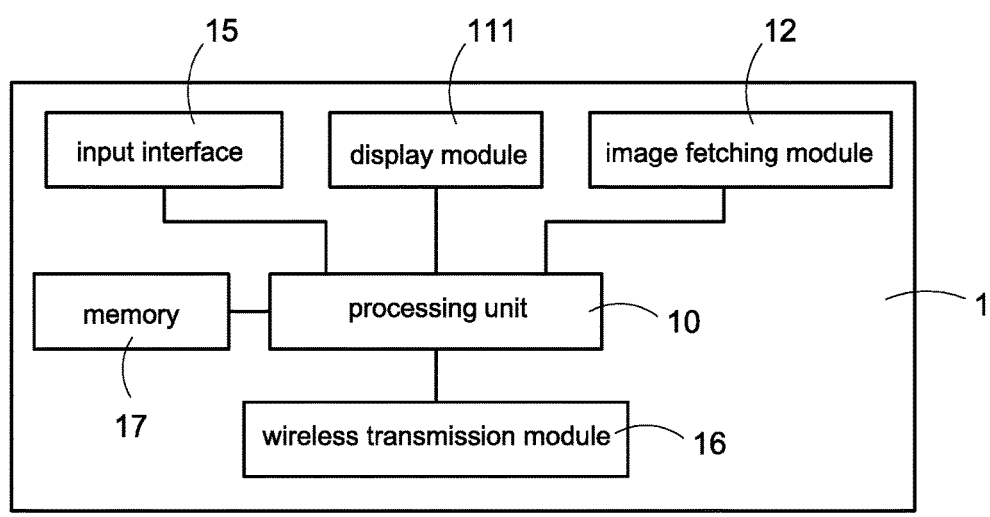
FIG. 4 is a block diagram of the body information analysis apparatus.

Referring to FIG. 4, it is a block diagram of the analysis apparatus 1. In FIG. 4, the analysis apparatus 1 comprises a display module 111, an image fetching module 12, an input interface 15, a wireless transmission module 16, a memory 17, and a processing unit 10 electrically connected to all of the above components.

In an embodiment, the image fetching module 12 is a camera or movie camera for capturing external images (e.g., the face of a user) and recording external information. The analysis apparatus 1 may analyze the images to identify the body parts such as face identification, neck identification or hand identification. As a result, the face, the neck or the hand of the user can be analyzed. Alternatively, corresponding actions are performed based on the external information.

The display module 111 is used to show the GUI. In an embodiment, the display module 111 is disposed in the screen 11. In response to activating the display module 111, light of the display module 111 passes through the one-way light penetration glass (not shown) of the screen 11 to be detected by the eyes of the user. Thus, the user may see the GUI on the screen 11. In response to deactivating the display module 111, the user only can see his or her image 4 on the screen 11 due to the nature of the one-way light penetration glass. In an embodiment, the analysis apparatus 1 may adjust light intensity or display areas of the display module 111 so that the screen 11 may show the GUI while reflecting the image 4 of the user.

The analysis apparatus 1 receives user input via the input interface 15 so that the user may interact with the GUI or perform setting. In an embodiment, the input interface 15 is the sensor 15 for sensing user gestures input. In another embodiment, the input interface 15 is an image fetching module 12 for capturing images and recording external information. In yet another embodiment, the input interface 15 is a touchscreen or the key 13 for receiving user input. In a further embodiment, the input interface 15 is a microphone for converting sound into an electrical signal. The wireless transmission module 16 functions to connect to the Internet 32. Specifically, the user accesses the analysis apparatus 1 via the Internet 32 for viewing information (e.g., body information) recorded by the analysis apparatus 1.

The memory 17 functions to store data. In an embodiment, the memory 17 comprises a database 170 for storing data (e.g., body information of the user, voice instructions issued by the analysis apparatus 1, information of cosmetics owned by the user, video clips for teaching how to apply makeup, and/or information of face shape discussed later).

The processing unit 10 is connected to the display module 111, the image fetching module 12, the input interface 15, the wireless transmission module 16 and the memory 17. The memory (not a volatile memory) 17 stores computer executable codes (not shown). The processing unit 10 can carry out the face shape detection method by executing the computer executable codes.

Figure 5:
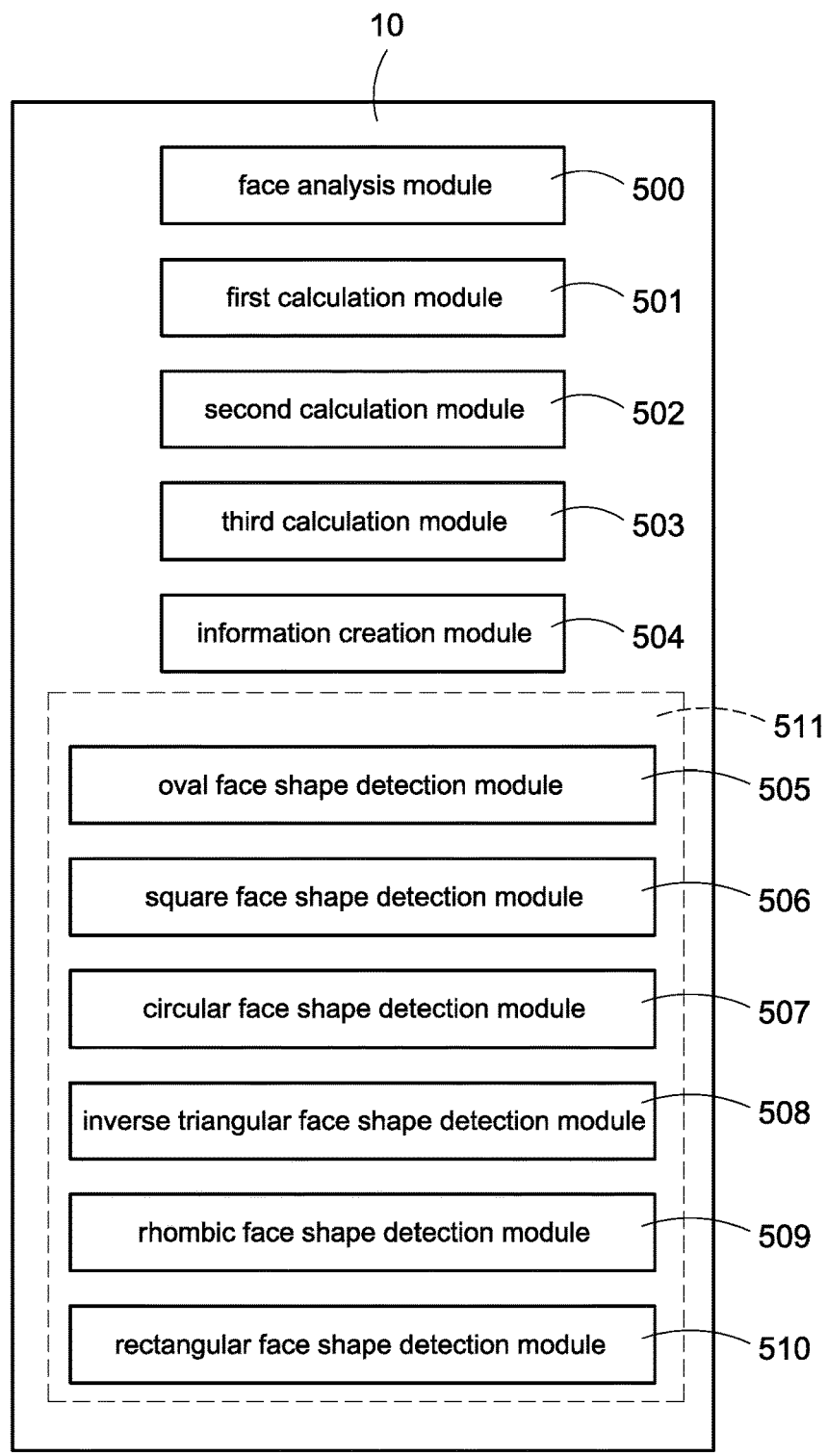
FIG. 5 is a block diagram of the processing unit.

Referring to FIG. 5, it is a block diagram of the processing unit 10. Specifically, the computer executable codes include a plurality of program codes each corresponding to a different module. The processing unit 10 can carry out the face shape detection method of the present disclosed example by executing the program codes. Therefore, functions of the modules can be performed. The computer executable codes can be classified as computer executable codes of the following modules: A face analysis module 500, a first calculation module 501, a second calculation module 502, a third calculation module 503, an information creation module 504, and a face detection module 511.

The face analysis module 500 is used to identify the face in the image fetched by the image fetching module 12 and position portions of the identified face. Specifically, the face analysis module 500 can identify the face in the image (e.g., the face image 6 of FIGS. 12 to 14). Also, the face analysis module 500 can analyze the image to identify features of body parts in the image (e.g., a plurality of features 7 of FIGS. 12-14). The features 7 correspond to different features of the body parts (e.g., the eyes, the mouth and the eyebrows) of the user such as tips of the ends of the eyebrows, the protruded portions of the mouth, the lower lip, and the ends of the eyebrows.

Each of the first calculation module 501, the second calculation module 502 and the third calculation module 503 calculate parameters (e.g., first ratio, second ratio and angle of the cheek) for various face shape detections (e.g., oval face shape detection, square face shape detection, circular face shape detection, inverse triangular face shape detection, rhombic face shape detection, and rectangular face shape detection) based on the features 7.

The information creation module 504 functions to create information of a corresponding face shape (e.g., information of oval face shape, square face shape, circular face shape, inverse triangular face shape, rhombic face shape detection, or rectangular face shape) based on the kind of the face shape.

In an embodiment, the information creation module 504 further comprises a drawing module and a display control module (both not shown). The drawing module functions to create a corresponding face contour (e.g., oval face contour, square face contour, circular face contour, inverse triangular face contour, rhombic face contour, or rectangular face contour) based on size of the face of a user and the kind of the face shape. The display control module controls the display module 111 to show both the face image and the face contour at the same time (see FIGS. 15A to 15F). By utilizing above display techniques of the present disclosed example, a user can confirm the kind of his or her face shape, thereby increasing extent of user experience.

In an embodiment, the information creation module 504 further comprises a plan module (not shown). Specifically, the memory 17 stores plans for applying cosmetics to different kinds of face shape including different wear plans for different kinds of face shape and different makeup techniques for different kinds of face shape. The plan module reads corresponding information from the memory 17 based on the kind of face shape and shows the same on the display module 111. By utilizing the present disclosed example, a user can find an appropriate wear or makeup after determining kind of his or her face shape, thereby increasing extent of user experience.

The face detection module 511 determines the face shape of a user based on the parameters obtained by calculating the first calculation module 501, the second calculation module 502 and the third calculation module 503.

In an embodiment, the face detection module 511 comprises an oval face shape detection module 505, a square face shape detection module 506, a circular face shape detection module 507, inverse triangular face shape detection module 508, rhombic face shape detection module 509, and rectangular face shape detection module 510. Each of the modules 505 to 510 detects the face image 6 of a user for confirming the kind of face shape of the user.

In embodiments of the present disclosed example, both the analysis apparatus and the method of detecting face shape by using same are provided to analyze the kind of face shape. Specifically, the face analysis module 500 identifies the face in the face image 6 and analyzes the image to identify features 7 of body parts in the image. Each of the first calculation module 501, the second calculation module 502 and the third calculation module 503 calculate parameters for face shape detection based on the features 7. The face detection module 511 determines the face shape of a user based on the parameters. Finally, the information creation module 504 instructs the display module 111 to show information of the corresponding face shape based on the kind of face shape.

Therefore, a user may understand the kind of his or her face shape by seeing the display module 111. Further, the user is aware of the wear and makeup suggestions provided by the analysis apparatus 1.

Figure 6:
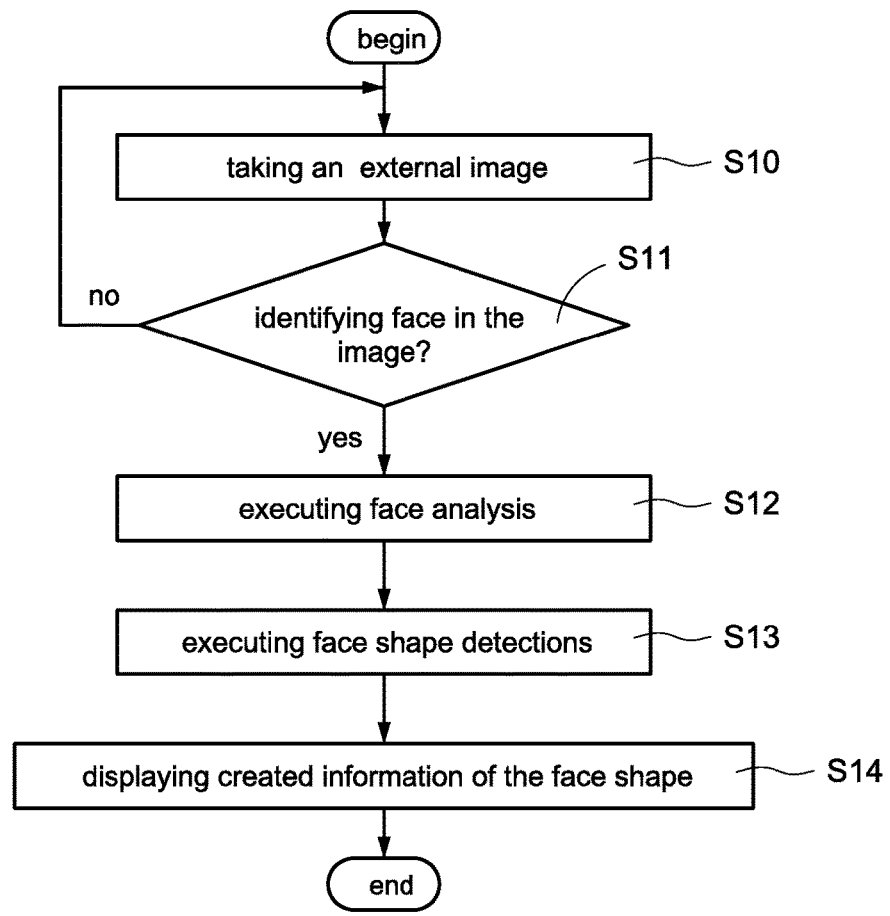
FIG. 6 is a flow chart illustrating a method of detecting face shape by using the body information analysis apparatus according to the present disclosed example.

Referring to FIG. 6, it is a flow chart illustrating a method of detecting face shape by using the analysis apparatus 1 according to the present disclosed example. The method comprising the following steps:

Step S10: The processing unit 10 of the analysis apparatus 1 instructs the image fetching module 12 to take a high resolution picture of a user and convert same into a digital external image. In an embodiment, the processing unit 10 instructs the display module 111 to display the external image, thereby giving an electronic mirror effect.

Step S11: The processing unit 10 instructs the face analysis module 500 to identify the face in the external image in order to determine whether the complete face image 6 is included in the external image. The face shape detection method goes to step S12 if the processing unit 10 determines that the complete face image 6 is included in the external image. Otherwise, the face shape detection method loops back step S10 to take a high resolution picture of a user and convert same into a digital image again.

Step S12: The processing unit 10 instructs the face analysis module 500 to identify location and range of the face in the face image 6 and cuts the face from the face image 6 based on the location and range of the face in the face image 6.

Next, the processing unit 10 instructs the face analysis module 500 to analyze face of the face image 6 in order to identify many parts of the face (e.g., the eyebrow, the forehead, the mouth, the face contour and the eye) in the face image 6. In an embodiment, the face analysis is a feature analysis for identifying features of a specific part of the face in the face image 6.

Specifically, the features analysis is done by executing a feature landmark algorithm which analyzes the face in the face image 6 in order to identify features of a specific part (e.g., the eyebrow, the forehead, the mouth, the face contour and the eye) of the face in a non-limiting manner. Further, the feature landmark algorithm is implemented by using Dlib library.

Figure 12:
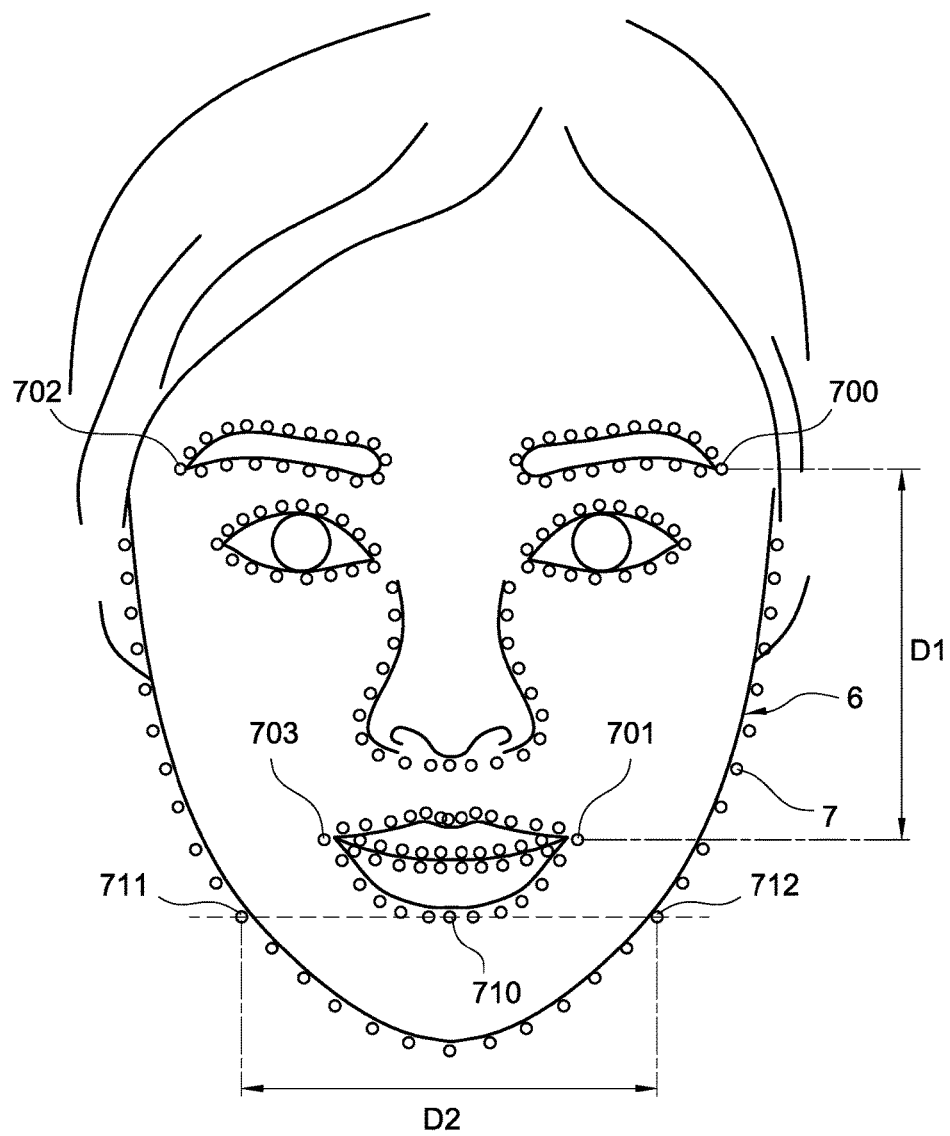
FIG. 12 schematically depicts the face to be analyzed for confirming its shape.
Figure 13:
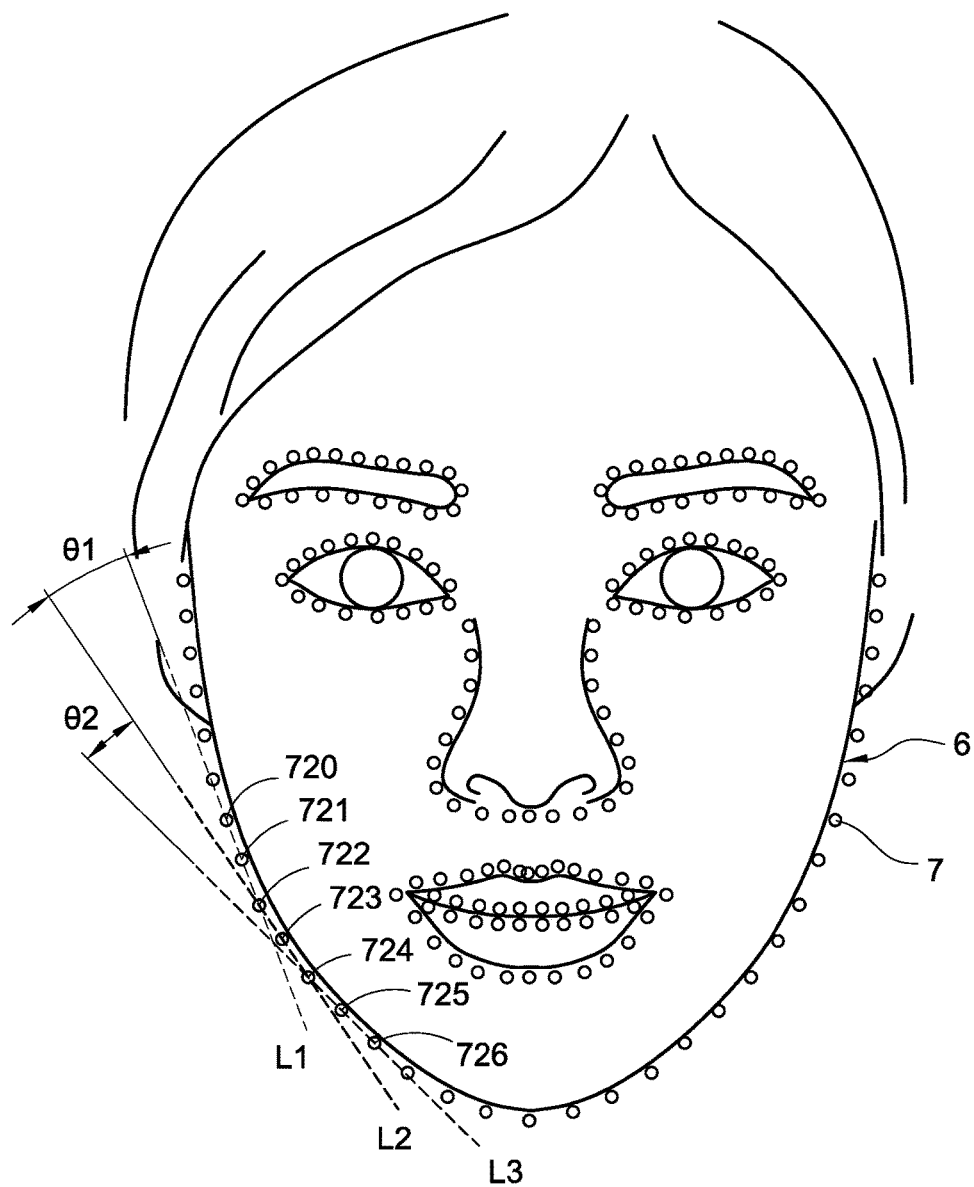
FIG. 13 further schematically depicts the face to be analyzed for confirming its shape.
Figure 14:
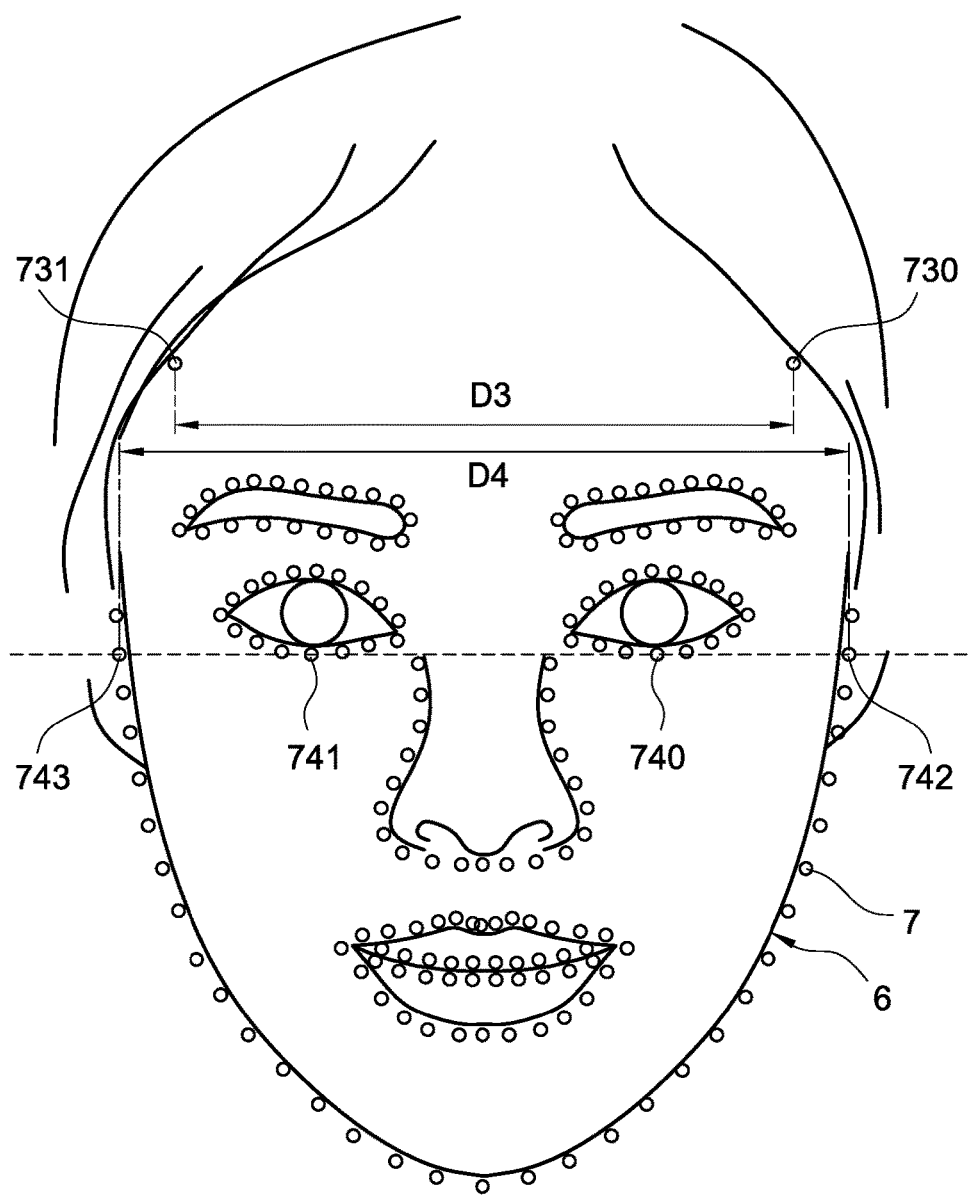
FIG. 14 still further schematically depicts the face to be analyzed for confirming its shape.
Figure 15A:
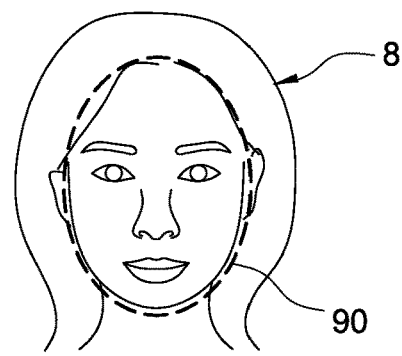
FIGS. 15A, 15B, 15C, 15D, 15E and 15F schematically depict the face to be analyzed for confirming its shape respectively.
Figure 15B:
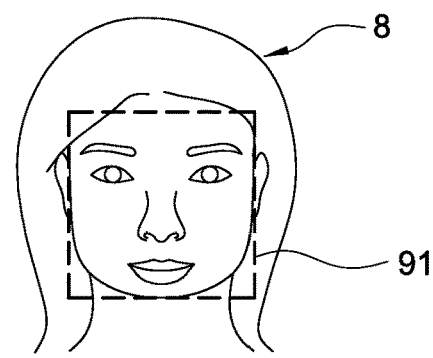
Figure 15C:
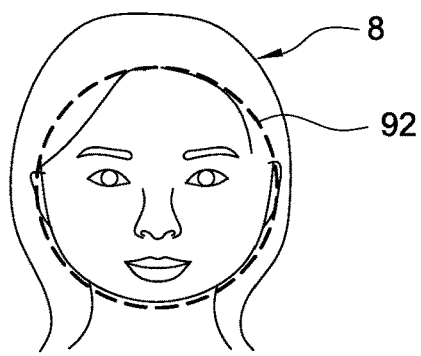
Figure 15D:
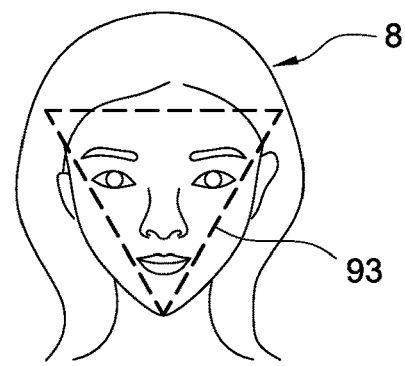
Figure 15E:
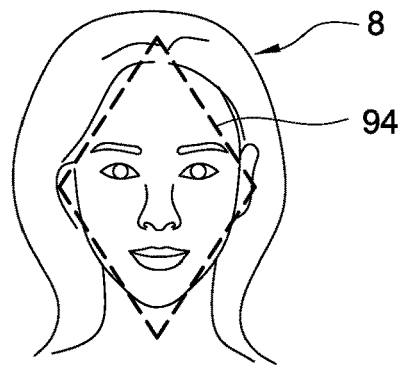
Figure 15F:
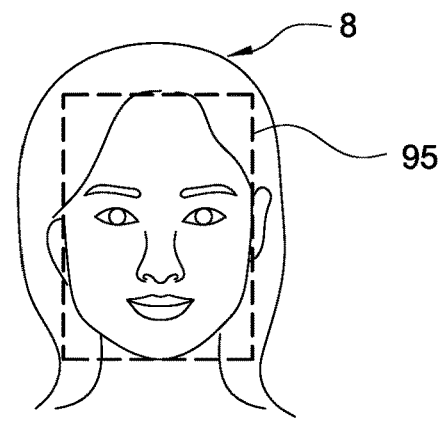

Referring to FIGS. 12, 13 and 14 in which FIG. 12 schematically depicts the face to be analyzed for confirming its shape, FIG. 13 further schematically depicts the face to be analyzed for confirming its shape, and FIG. 14 still further schematically depicts the face to be analyzed for confirming its shape. The face analysis module 500 executes the feature landmark algorithm to analyze the face image 6. The feature landmark algorithm is known in the art as a machine learning technique for analyzing the specific body parts in the face image 6. Thus, features 7 of one or more body parts (e.g., the eyebrow, the forehead, the mouth, the face contour and the eye) can be identified in the face image 6. The features 7 correspond to different features of the specific body parts.

Taking the eyebrow identification as an example, the features 7 correspond to one end, the peak and the other end of the eyebrow. Taking the mouth identification as an example, the features 7 correspond to the upper lip, the sides of the mouth and the lower lip. The number of the features 7 is 68, 198 or any of other numbers in a non-limiting manner.

Also, the feature landmark algorithm can be performed to mark the features 7 of the specific body parts in the face image 6. As shown in FIGS. 12 to 14, the feature landmark algorithm can be performed to mark the features 7 in the face image 6.

In an embodiment, the face analysis module 500 assigns numbers to the features 7 based on the body parts that the features 7 belong to. The present disclosed example can identify locations of the body parts in the face image 6 based on the numbers, shapes and sequences of the features 7. As a result, the body parts in the face image 6 can be identified.

Referring to FIG. 6 again, after step S12, the processing unit 10 instructs the face analysis module 500 to identify the plurality of the features 7. The step S13 is then executed. The processing unit 10 executes one or more face shape detections (e.g., oval face shape detection, square face shape detection, circular face shape detection, inverse triangular face shape detection, rhombic face shape detection, and rectangular face shape detection) to determine the kind of face shape of the user by activating the face detection module 511 based on the identified part of the face and the features 7.

In an embodiment, the processing unit 10 sequentially executes the oval face shape detection, the square face shape detection, the circular face shape detection, the inverse triangular face shape detection, the rhombic face shape detection, and the rectangular face shape detection in order to determine whether the user has an oval, square, circular, inverse triangular, rhombic, or rectangular face shape.

Step S14: The processing unit 10 instructs the information creation module 504 to create information of a corresponding face shape based on the kind of the face shape determined by step S13, and sends the created information of the face shape to the display module 111 for display.

Therefore, the present disclosed example can automatically detect face shape of a user so that the user may take the detected face shape as a reference for wear.

Figure 7:
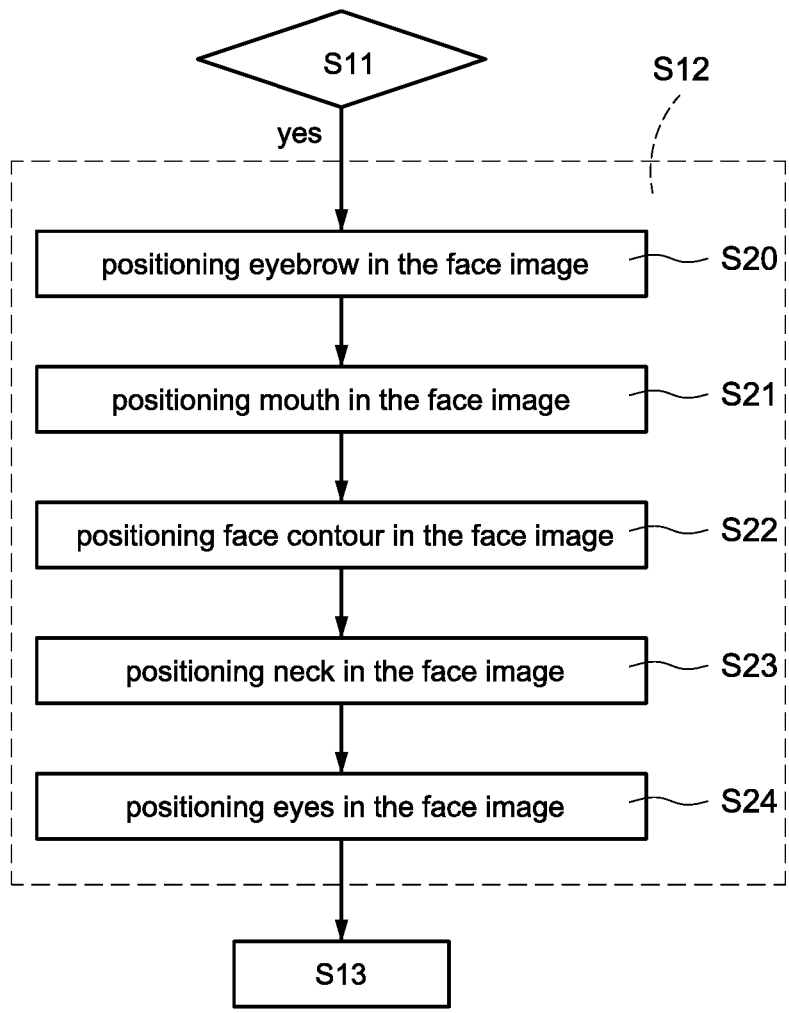
FIG. 7 is a flow chart illustrating details of step S12.

Referring to FIG. 7 in conjunction with FIGS. 6 and 12 to 14 in which FIG. 7 is a flow chart illustrating details of step S12. In comparison with the embodiment of FIG. 6, step S12 of the face shape detection method of the present disclosed example further comprises the following steps:

Step S20: The processing unit 10 instructs the face analysis module 500 to position the eyebrow in the face image 6 for identifying one or more features of the eyebrow in which the features correspond to different parts of the eyebrow.

In an embodiment, the face analysis module 500 positions two ends of each eyebrow to identify at least one of two features at the ends of the eyebrow (see the eyebrow tail feature 700 at one end of one eyebrow and the eyebrow tail feature 702 at one end of the other eyebrow of FIG. 12).

Step S21: The processing unit 10 instructs the face analysis module 500 to position the mouth in the face image 6 for identifying one or more features of the mouth in which the features correspond to different parts of the mouth.

In an embodiment, the face analysis module 500 positions two ends of the mouth to identify at least one of two features at the ends of the mouth (see the mouth corner feature 701 at one end of the mouth and the mouth corner feature 703 at the other end of the mouth of FIG. 12).

In an embodiment, the face analysis module 500 positions the lower lip for identifying features of the lower lip (see the lower lip feature 710 at the lower lip of FIG. 12). Further, the feature is at a center of a lower end of the lower lip.

Step S22: The processing unit 10 instructs the face analysis module 500 to position the face contour in the face image 6 for identifying one or more features of the face contour in which the features correspond to different parts of the face contour.

In an embodiment, the face analysis module 500 positions two cheeks of the face contour to identify at least one of two features at the ends of the face contour (see the contour feature 711 at one cheek of the face contour and the contour feature 712 at the other cheek of the face contour of FIG. 12). Further, the contour features 711, 712 have the same elevation as the lower lip feature 710 of the lower lip.

In an embodiment, the face analysis module 500 positions one cheek of the face contour to identify a plurality of contour features (see the contour features 720-726 at one cheek of the face contour of FIG. 13).

In an embodiment, the face analysis module 500 positions two bone cheeks of the face contour to identify a plurality of contour features (see the contour features 742, 743 of FIG. 14). Further, the contour features 742, 743 of the bone cheeks have the same elevation as at least one of two lower eye features 740, 741 on a lower edge of the eyes respectively as discussed later.

Step S23: The face analysis module 500 positions the forehead to identify one or more features at the forehead in which the features correspond to different parts of the forehead.

In an embodiment, the face analysis module 500 positions two sides of the forehead to identify two features at the forehead (see the forehead features 730, 731 at two ends of the forehead respectively of FIG. 14).

Step S24: The face analysis module 500 positions two eyes to identify one or more features at the eyes in the face image 6 in which the features correspond to different parts of the eyes.

In an embodiment, the face analysis module 500 positions a lower edge of at least one of the eyes to identify features thereat (see the lower eye feature 740, 741 at lower edges of the eyes respectively of FIG. 14). Further, the lower eye feature 740, 741 are at centers of a lower end of the eyes respectively.

It is noted that the eyebrows, the mouth, the face contour, the forehead and the eyes are discussed in the embodiment for explaining positioning in a non-limiting manner.

In another embodiment, the face analysis module 500 positions a corresponding part and identifies corresponding features 7 based on the kind of a subsequent face shape detection.

Taking an oval face shape detection as an example, the face analysis module 500 can identify one of the eyebrow tail features 700, 702 at the ends of the eyebrow, one of the mouth corner features 701, 703 of the mouth, the lower lip feature 710 of the lower lip and the contour features 711, 712 of the face contour as detailed later.

Taking a square face shape detection as an example, the face analysis module 500 can identify one of the contour features 720-726 of the of the face contour as detailed later.

Taking inverse triangular face shape detection, rhombic face shape detection, and rectangular face shape detection as an example, the face analysis module 500 can identify the forehead features 730, 731 of the forehead, the lower eye feature 740, 741 of the eyes, and the contour features 742, 743 of the face contour respectively as detailed later.

By selecting features to be identified based on the kind of analysis apparatus 1 to be detected, the present disclosed example can greatly decrease the number of features to be identified and greatly increase identification rate of the features of the face.

In an embodiment, the face analysis module 500 identifies all features of the face (e.g., 198 features to be identified) and then selects required features 7 for subsequent processing.

Figure 8:
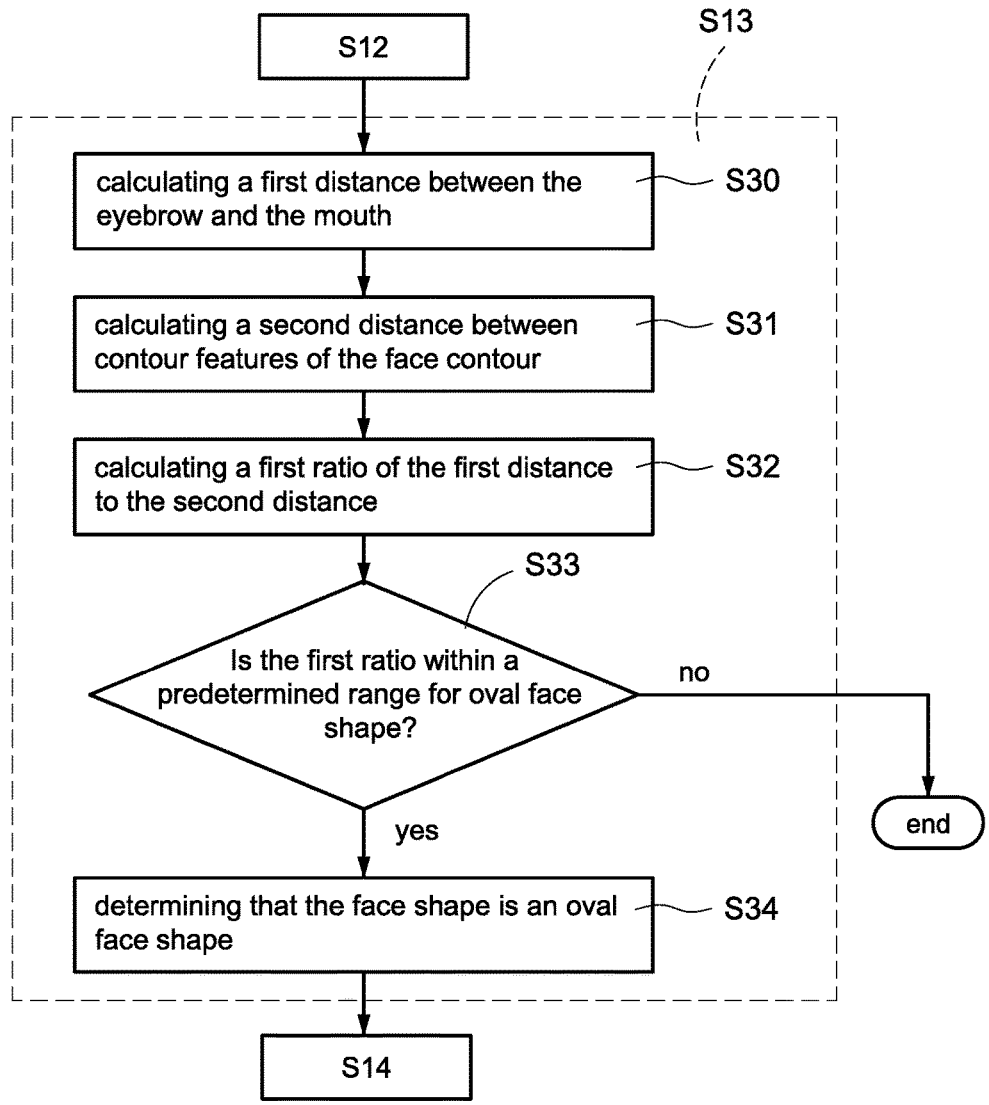
FIG. 8 is a flow chart illustrating details of step S13 according to a first embodiment of the present disclosed example.

Referring to FIG. 8 in conjunction with FIGS. 6 and 12 in which FIG. 8 is a flow chart illustrating details of step S13 according to a first embodiment of the present disclosed example. In comparison with the embodiment of FIG. 6, step S13 of the face shape detection method of the present disclosed example further comprises the following steps:

Step S30: The processing unit 10 instructs the first calculation module 501 to calculate a distance between the eyebrow and the mouth.

In an embodiment, the first calculation module 501 selects one of the eyebrow tail features 700, 702 at the ends of the eyebrow (e.g., the eyebrow tail feature 700 at one end of the eyebrow), selects one of the mouth corner features 701, 703 at the ends of the mouth (e.g., the feature 703 at one end of the mouth), and calculates a vertical distance between the eyebrow tail feature 700 at one end of the eyebrow and the feature 703 at one end of the mouth (see a first distance D1 of FIG. 12).

Step S31: The processing unit 10 instructs the first calculation module 501 to calculate a horizontal distance between a plurality of contour features of the face contour (e.g., the first contour features of the face contour). Specifically, the first calculation module 501 selects two of the contour features of the face contour and calculates a horizontal distance between the selected two contour features of the face contour (see a second distance D2 of FIG. 12). Further, the first calculation module 501 selects the contour features 711, 712 of the face contour having the same elevation as the lower lip feature 710 of the lower lip.

Step S32: The processing unit 10 instructs the first calculation module 501 to calculate a first ratio of the first distance D1 to the second distance D2. For example, the first ratio (D1/D2) is 0.625 if the first distance D1 is 500 pixels and the second distance D2 is 800 pixels.

Step S33: The processing unit 10 instructs the oval face shape detection module 505 to determine whether the first ratio calculated by the first calculation module 501 is within a first predetermined range (e.g., 0.8 to 1.2) for oval face shape stored in the memory 17 or not.

In an embodiment, the processing unit 10 determines that the face shape is oval if the first ratio is within the first predetermined range (e.g., 0.8 to 1.2) for oval face shape. Thereafter, the face shape detection method to a next step S34. Otherwise, the processing unit 10 determines that the face shape is not an oval face shape and the face shape detection method ends.

In another embodiment, after determining that the face shape is not an oval face shape, the processing unit 10 performs other face shape detection processes. For example, the face shape detection processes, as discussed in steps S40 to S46 of FIG. 9, include circular face shape detection and square face shape detection. Alternatively, steps S50 to S57 of FIG. 10 are executed to perform inverse triangular face shape detection, rhombic face shape detection and rectangular face shape detection.

Step S34: After determining that the face shape in the face image 6 is an oval face shape by the oval face shape detection module 505 as instructed by the processing unit 10, the face shape detection method goes to step S14 in which the processing unit 10 instructs the information creation module 504 to create information of the oval face shape. Further, the information creation module 504 sends the information of the oval face shape to a next step. By utilizing the present disclosed example, it is possible of determining whether the present face is an oval face or not.

Figure 9:
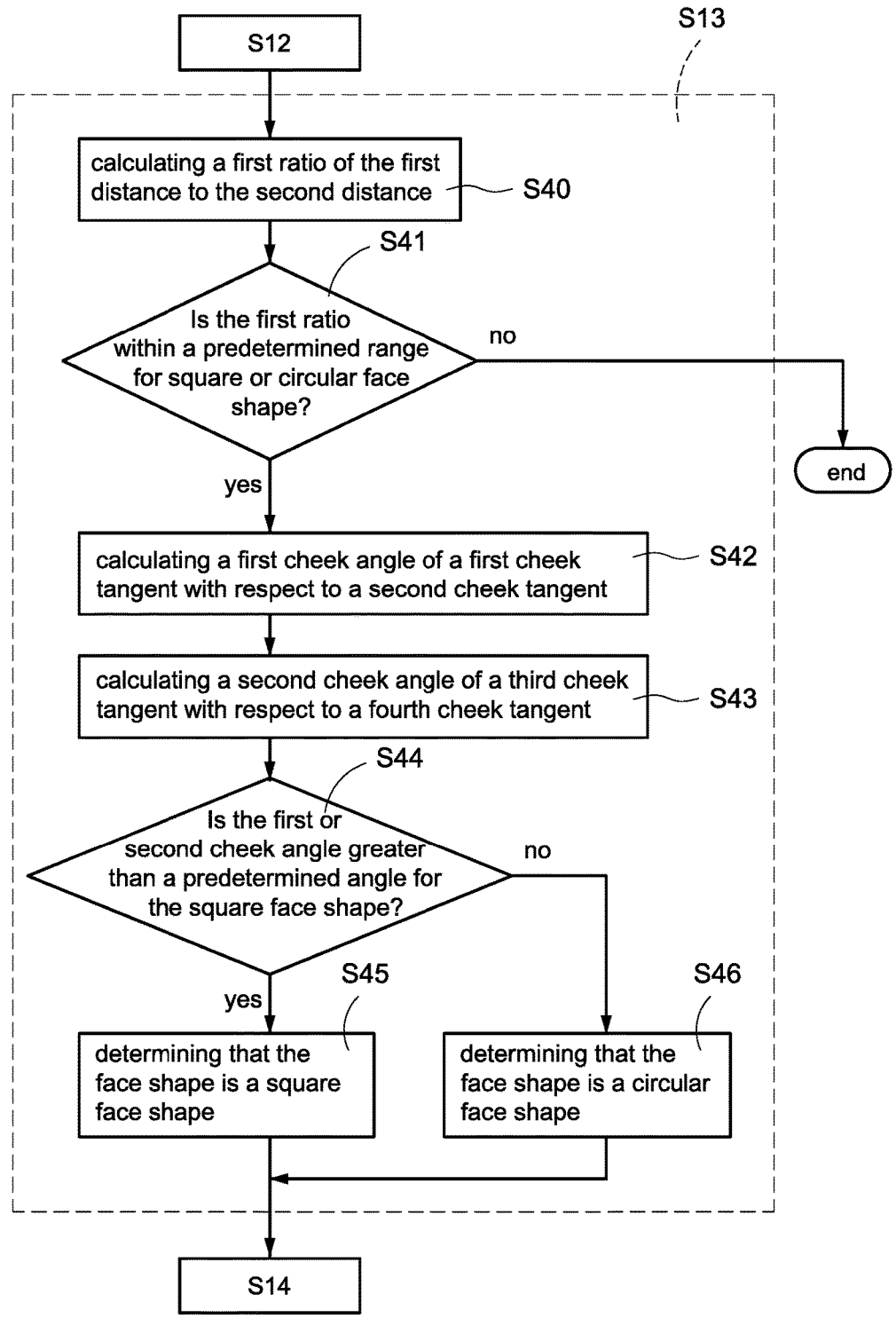
FIG. 9 is a flow chart illustrating details of step S13 according to a second embodiment of the present disclosed example.
Figure 10:
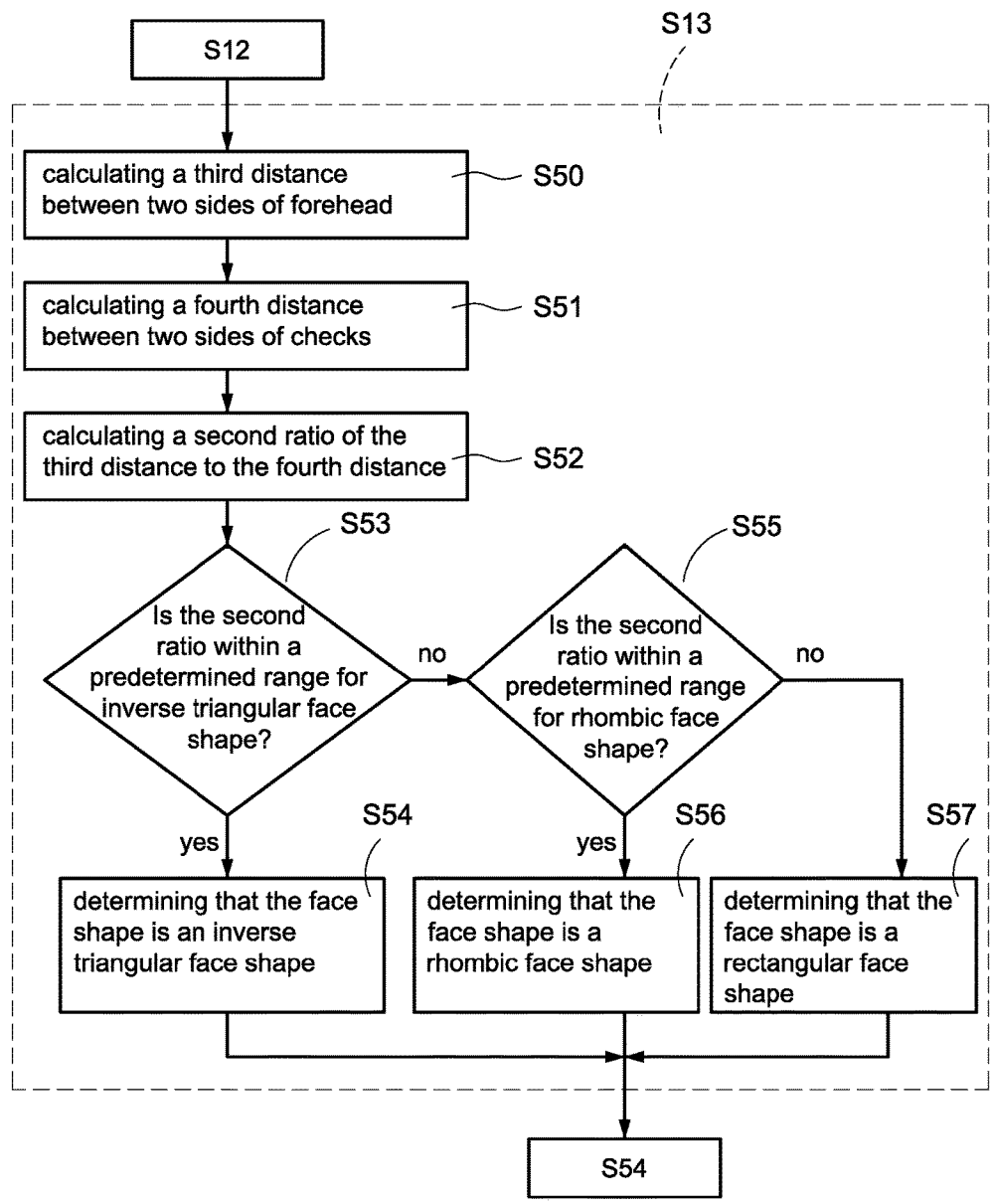
FIG. 10 is a flow chart illustrating details of step S13 according to a third embodiment of the present disclosed example.

Referring to FIG. 9 in conjunction with FIGS. 6 and 12 again in which FIG. 9 is a flow chart illustrating details of step S13 according to a second embodiment of the present disclosed example. In comparison with the embodiment of FIG. 6, step S13 of the face shape detection method of the present disclosed example further comprises the following steps with respect to square face shape detection and circular face shape detection:

Step S40: The processing unit 10 instructs the first calculation module 501 to calculate a first ratio of the first distance D1 to the second distance D2. The calculation of the first ratio is the same as that described in steps S30 to S32 of FIG. 8 and thus a detailed description thereof is omitted herein for the sake of brevity.

Step S41: The processing unit 10 determines whether the first ratio is within a second predetermined range (e.g., 0.6 to 0.7) for square or circular face shape stored in the memory 17 or not. It is understood that the second predetermined range (e.g., 0.6 to 0.7) is less than the first predetermined range (e.g., 0.8 to 1.2).

In an embodiment, the processing unit 10 determines that the face shape is square or circular face shape if the first ratio is within the second predetermined range (e.g., 0.6 to 0.7) for square or circular face shape. Thereafter, the face shape detection method goes to a next step S42. Otherwise, the processing unit 10 determines that the face shape is not a square or circular face shape and the face shape detection method ends.

In another embodiment, after determining that the face shape is not a square or circular face shape, the processing unit 10 performs other face shape detection processes. For example, the face shape detection processes, as discussed in steps S30 to S34 of FIG. 8, include oval face shape detection. Alternatively, steps S50 to S57 of FIG. 10 are executed to perform inverse triangular face shape detection, rhombic face shape detection and rectangular face shape detection.

Step S42: The processing unit 10 instructs the second calculation module 502 to calculate a first cheek angle of a first cheek tangent with respect to a second cheek tangent.

As shown in FIG. 13, in an embodiment the second calculation module 502 selects a plurality of features (e.g., the adjacent contour features 720 to 722 as the second features of the face contour) and calculates a cheek tangent L1 (i.e., the first cheek tangent) based on the selected contour features 720 to 722 of the face contour. Thus, the straight line touches the contour features 720 to 722 of the face contour is taken as the cheek tangent L1. Next, the second calculation module 502 selects a plurality of features (e.g., the adjacent features 722 to 724 as the third features of the face contour) in which the selected features of the face contour can be partially or completely the same as the previously selected features. Further, the second calculation module 502 calculates a cheek tangent L2 (i.e., the second cheek tangent) based on the selected features 722 to 724 of the face contour. Thus, the straight line touches the features 722 to 724 of the face contour is taken as the cheek tangent L2. Finally, a first cheek angle θ1 of the cheek tangent L1 with respect to the cheek tangent L2 is calculated by the second calculation module 502.

Step S43: The processing unit 10 instructs the second calculation module 502 to calculate a second cheek angle of a third cheek tangent with respect to a fourth cheek tangent.

In an embodiment, the features of the third cheek tangent are the same as that of the second cheek tangent (i.e., the second cheek tangent and the third cheek tangent being completely overlapped) in a non-limiting manner.

In another embodiment, the features of the third cheek tangent are not the same as that of the second cheek tangent (i.e., the second cheek tangent being partially overlapped the third cheek tangent). Alternatively, the features of the third cheek tangent are completely different from that of the second cheek tangent (i.e., the second cheek tangent being completely not overlapped the third cheek tangent).

As shown in FIG. 13, taking the second cheek tangent and the third cheek tangent being completely overlapped as an example, the second calculation module 502 selects a plurality of contour features (e.g., the adjacent contour features 722 to 724 as the fourth contour features of the face contour) in which the second calculation module 502 calculates a cheek tangent L2 (i.e., the third cheek tangent being completely overlapped the second cheek tangent) based on the selected contour features 722 to 724 of the face contour. Next, the second calculation module 502 selects a plurality of contour features (e.g., the adjacent contour features 724 to 726 as the fifth contour features of the face contour) in which the selected contour features of the face contour can be partially or completely the same as the previously selected contour features. Next, the second calculation module 502 calculates a cheek tangent L3 (i.e., the fourth cheek tangent) based on the selected contour features 724 to 726 of the face contour. Thus, the straight line touches the contour features 724 to 726 of the face contour is taken as the cheek tangent L3. Finally, a second cheek angle θ2 of the cheek tangent L2 with respect to the cheek tangent L3 is calculated by the second calculation module 502.

Step S44: The processing unit 10 instructs the square face shape detection module 506 and the circular face shape detection module 507 to determine whether the first cheek angle θ1 or the second cheek angle θ2 calculated by the second calculation module 502 is greater than a predetermined angle (e.g., 5°) for the square face shape stored in the memory 17 or not.

In an embodiment, the processing unit 10 selects one of the first cheek angle θ1 and the second cheek angle θ2 having a greater angle and determine whether the selected angle is greater than the predetermined angle (e.g., 5°) in a non-limiting manner.

In another embodiment, the processing unit 10 compares the first cheek angle θ1 with the predetermined angle and compares the second cheek angle θ2 with the predetermined angle respectively.

The face shape detection method goes to step S45 if the determination is yes (i.e., the face shape being determined as square face shape). Otherwise, the face shape detection method goes to step S46 (i.e., the face shape being determined as not square face shape) prior to going to step S14.

In another embodiment, after determining that the face shape is not a square face shape, the processing unit 10 performs other face shape detection processes. For example, the face shape detection processes, as discussed in steps S30 to S34 of FIG. 8, include oval face shape detection. Alternatively, steps S50 to S57 of FIG. 10 are executed to perform inverse triangular face shape detection, rhombic face shape detection and rectangular face shape detection.

In an embodiment, the predetermined angle for square face shape is in the range of 3° to 5°. Thus, the processing unit 10 selects at least one of the first cheek angle θ1 and the second cheek angle θ2 that falls in the range and performs the step S45. Alternatively, the processing unit 10 performs the step S46 if neither of the first cheek angle θ1 and the second cheek angle θ2 falls in the range.

Step S45: The square face shape detection module 506 instructed by the processing unit 10 determines that the face in the face image 6 is a square face shape. Next, the face shape detection method goes to step S14 in which the processing unit 10 instructs the information creation module 504 to create information of the square face shape. Further, the information creation module 504 sends the information of the square face shape to a next step.

The processing unit 10 performs the step S46 if neither of the first cheek angle θ1 and the second cheek angle θ2 falls in the range of the predetermined angle for square face shape. The square face shape detection module 506 instructed by the processing unit 10 determines that the face in the face image 6 is a circular face shape. Next, the face shape detection method goes to step S14 in which the processing unit 10 instructs the information creation module 504 to create information of the circular face shape. Further, the information creation module 504 sends the information of the circular face shape to a next step. By utilizing the present disclosed example, it is possible of determining whether the present face is a square face or a circular face.

Referring to FIG. 10 in conjunction with FIGS. 6 and 12 in which FIG. 10 is a flow chart illustrating details of step S13 according to a third embodiment of the present disclosed example. In comparison with the embodiment of FIG. 6, step S13 of the face shape detection method of the present disclosed example further comprises the following steps:

Step S50: The processing unit 10 instructs the third calculation module 503 to calculate a distance between two ends of the forehead.

In an embodiment, the third calculation module 503 selects the forehead feature 730 at one end of the forehead, the forehead feature 731 at the other end of the forehead, and calculates a horizontal distance between the forehead feature 730 and the forehead feature 731 (see a third distance D1 of FIG. 14).

Step S51: The processing unit 10 instructs the third calculation module 503 to calculate a horizontal distance between a plurality of contour features of the face contour (e.g., the sixth contour features of the face contour). Specifically, the third calculation module 503 selects two of the contour features of the face contour and calculates a horizontal distance between the selected two contour features of the face contour (see a fourth distance D4 of FIG. 14). Further, the third calculation module 503 selects the contour features 742, 743 of the face contour having the same elevation as the lower eye feature 740, 741 at the lower edges of the eyes.

Step S52: The processing unit 10 instructs the third calculation module 503 to calculate a second ratio of the third distance D3 to the fourth distance D4. For example, the second ratio (D3/D4) is 0.8 if the third distance D3 is 800 pixels and the fourth distance D4 is 1,000 pixels.

Step S53: The processing unit 10 instructs the inverse triangular face shape detection module 508 to determine whether the second ratio calculated by the third calculation module 503 is within a predetermined range (e.g., 0.95 to 1.05) for inverse triangular face shape stored in the memory 17 or not.

In an embodiment, the processing unit 10 determines that the face shape is inverse triangular if the second ratio is within the predetermined range (e.g., 0.95 to 1.05) for inverse triangular face shape. Thereafter, the face shape detection method goes to a next step S54. Otherwise, the processing unit 10 determines that the face shape is not an inverse triangular face shape and the face shape detection method goes to step S55.

Step S54: The inverse triangular face shape detection module 508 instructed by the processing unit 10 determines that the face in the face image 6 is an inverse triangular face shape. Next, the face shape detection method goes to step S14 in which the processing unit 10 instructs the information creation module 504 to create information of the inverse triangular face shape. Further, the information creation module 504 sends the information of the inverse triangular face shape to a next step.

Step S55: The rhombic face shape detection module 509 and the rectangular face shape detection module 510 both instructed by the processing unit 10 determine whether the second ratio calculated by the third calculation module 503 is within a predetermined range (e.g., 0.65 to 0.67) for rhombic face shape stored in the memory 17 or not.

In an embodiment, the processing unit 10 determines that the face shape is rhombic if the second ratio is within the predetermined range (e.g., 0.65 to 0.67) for rhombic face shape. Thereafter, the face shape detection method goes to a next step S54. Otherwise, the processing unit 10 determines that the face shape is not a rhombic face shape and the face shape detection method goes to step S57.

Step 56: The rhombic face shape detection module 509 instructed by the processing unit 10 determines that the face in the face image 6 is a rhombic face shape. Next, the face shape detection method goes to step S14 in which the processing unit 10 instructs the information creation module 504 to create information of the rhombic face shape. Further, the information creation module 504 sends the information of the rhombic face shape to a next step. By utilizing the present disclosed example, it is possible of determining whether the present face is a rhombic face or not.

The processing unit 10 determines that the face shape is not rhombic if the second ratio is not within the predetermined range (e.g., 0.65 to 0.67) for rhombic face shape. Thereafter, the face shape detection method goes to step S57. The rectangular face shape detection module 510 instructed by the processing unit 10 determines that the face in the face image 6 is a rectangular face shape. Next, the face shape detection method goes to step S14 in which the processing unit 10 instructs the information creation module 504 to create information of the rectangular face shape. Further, the information creation module 504 sends the information of the rectangular face shape to a next step. By utilizing the present disclosed example, it is possible of determining whether the present face is a rectangular face or not.

Figure 11:
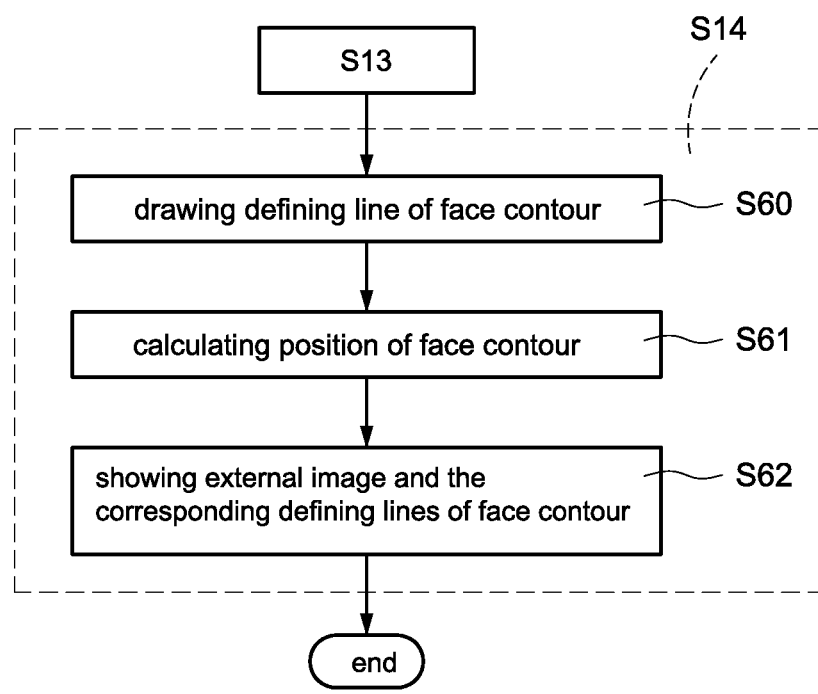
FIG. 11 is a flow chart illustrating details of step S14.

Referring to FIG. 11 and FIGS. 15A to 15F in conjunction with FIG. 6 in which FIG. 11 is a flow chart illustrating details of step S14, and FIGS. 15A, 15B, 15C, 15D, 15E and 15F schematically depict the face to be analyzed for confirming its shape respectively. In the embodiment, the face shape information includes defining line of the face contour and location of the face contour. In comparison with the embodiment of FIG. 6, step S14 of the face shape detection method of the present disclosed example further comprises the following steps for showing defining line of the face contour:

Step S60: The processing unit 10 instructs the information creation module 504 to calculate size of the face in the external image 8 and draw the defining line of the face contour based on the size of the face. In an embodiment, the information creation module 504 draws the defining line of the face contour based on the kind of the face shape in step S13.

For example, the information creation module 504 draws an oval as the defining line of the face contour if the face shape in the external image 8 is oval. Likewise, the information creation module 504 draws a square as the defining line of the face contour if the face shape in the external image 8 is square.

Further, the information creation module 504 draws a minimum closed line around the face as the defining line of the face contour (see the defining line of the face contour in each of FIGS. 15A to 15F).

Step S61: The processing unit 10 instructs the information creation module 504 to calculate position of the face in the external image 8 and set the calculated position as the position of the defining line of the face contour created in step S60.

Step S62: The processing unit 10 instructs the information creation module 504 to control the display module 111 to show the external image 8 and the corresponding defining lines 90 to 95 of the face contour in FIGS. 15A to 15F so that the defining lines 90 to 95 of the face contour in FIGS. 15A to 15F can be shown in the form of closed line around the face. By utilizing the present disclosed example, a user can see his or her face image 6 and the defining line of the face contour of his or her face shape. As a result, the user can confirm the kind of his or her face shape.

While the present disclosed example has been described in terms of preferred embodiments, those skilled in the art will recognize that the present disclosed example can be practiced with modifications within the spirit and scope of the appended claims.

What is claimed is:

1. A body information analysis apparatus, comprising:
    an image fetching module for recording an external image;
    a display module for showing information of a face shape;
    a processing unit electrically connected to both the image fetching module and the display module, and including:
    a face analysis module for positioning two eyebrows, a mouth and two first contour features of a face contour in response to identify a face in the external image recorded by the image fetching module wherein the first contour features are disposed at two sides of the face respectively and have an elevation the same as that of the mouth in the face contour;
    a first calculation module for calculating a vertical distance between the mouth and either eyebrow and taking the vertical distance as a first distance, calculating a horizontal distance between the first contour features and taking the horizontal distance as a second distance, and calculating a first ratio of the first distance to the second distance;
    a face detection module for determining the face shape based on the first ratio; and
    an information creation module for creating information of a corresponding face shape based on the determined face shape.

2. The body information analysis apparatus as claimed in claim 1, wherein the face analysis module identifies an eyebrow tail feature at one of the eyebrows, a mouth corner feature at the mouth, and a lower lip feature at the mouth, and the first contour features having an elevation the same as the lower lip feature; wherein the first calculation module calculates a vertical distance between the eyebrow tail feature and the mouth corner feature and takes the vertical distance as the first distance; wherein the face detection module includes an oval face shape detection module for identifying the face shape as an oval face shape when the first ratio is in range of a predetermined ratio for the oval face shape; wherein the information creation module draws a defining line of the oval face contour based on size of the face when the face shape is identified as the oval face shape, and calculates a location of the oval face shape based on a location of the face; and wherein the display module is configured to show the external image and show the defining line of the oval face contour at the location of the oval face shape so that the defining line of the oval face contour surrounds the face.

3. The body information analysis apparatus as claimed in claim 1, wherein the face analysis module positions a plurality of second contour features and a plurality of third contour features both at one cheek of the face contour; wherein the plurality of the second contour features are partially overlapped the plurality of third contour features; wherein the processing unit further comprise a second calculation module for calculating a first cheek angle of a first cheek tangent formed by the second contour features with respect to a second cheek tangent formed by the third contour features; wherein the face detection module includes a square face shape detection module for identifying the face shape as a square face shape when the first ratio is in range of a predetermined ratio for symmetry and the first cheek angle is greater than a predetermined angle for square face shape; wherein the predetermined ratio for symmetry is less than a predetermined ratio for oval face shape; wherein the information creation module is configured to create information of the square face shape based on the determined square face shape; and wherein the display module is configured to show information of the square face shape.

4. The body information analysis apparatus as claimed in claim 1, wherein the face analysis module positions a plurality of second contour features, a plurality of third contour features, a plurality of fourth contour features, and a plurality of fifth contour features all at one cheek of the face contour; wherein the plurality of the second contour features are partially overlapped the plurality of third contour features, the plurality of the third contour features are partially overlapped the plurality of fourth contour features, and the plurality of the fourth contour features are partially overlapped the plurality of fifth contour features; wherein the processing unit further comprise a second calculation module for calculating a first cheek angle of a first cheek tangent formed by the second contour features with respect to a second cheek tangent formed by the third contour features, and a second cheek angle of a third cheek tangent formed by the fourth contour features with respect to a fourth cheek tangent formed by the fifth contour features; wherein the face detection module includes a square face shape detection module for identifying the face shape as a square face shape when the first ratio is in range of a predetermined ratio for symmetry and the first cheek angle or the second cheek angle is greater than a predetermined angle for square face shape, and a circular face shape detection module for identifying the face shape as a circular face shape when the first ratio is in range of a predetermined ratio for symmetry and both the first cheek angle and the second cheek angle are not greater than the predetermined angle for square face shape; wherein the information creation module is configured to create information of the square face shape based on the determined square face shape; wherein the information creation module is configured to create information of the circular face shape based on the determined circular face shape; and wherein the display module is configured to show information of the square face shape or the circular face shape.

5. The body information analysis apparatus as claimed in claim 1, wherein the face analysis module positions the forehead of the face and a plurality of sixth contour features at two bone cheeks of the face contour respectively; wherein the plurality of the sixth contour features are at an elevation the same as that of either eye; wherein the processing unit further comprise a third calculation module for calculating a horizontal distance between two ends of the forehead of the face and takes the horizontal distance as a third distance, calculating a horizontal distance between the sixth contour features and takes the horizontal distance as a fourth distance, and calculating a second ratio of the third distance to the fourth distance; wherein the face detection module includes inverse triangular face shape detection module for identifying the face shape as an inverse triangular face shape when the first ratio is not in range of a predetermined ratio for oval face shape, the first ratio is not in range of a predetermined ratio for symmetry, and the second ratio is in range of a predetermined ratio for inverse triangular face shape; wherein the information creation module is configured to create information of the inverse triangular face shape based on the determined inverse triangular face shape; and wherein the display module is configured to show information of the inverse triangular face shape.

6. The body information analysis apparatus as claimed in claim 5, wherein for identifying the face contour the face analysis module identifies two forehead features at two sides of a forehead respectively; a lower eye feature on one lower edge of the eye, and the sixth contour features having an elevation the same as that of the lower eye feature; and wherein the third calculation module calculates a horizontal distance between the forehead features of the forehead of the face and takes the horizontal distance as the third distance.

7. The body information analysis apparatus as claimed in claim 5, wherein the face detection module further comprises:
 rhombic face shape detection module for identifying the face shape as a rhombic face shape when the first ratio is not in the range of the predetermined ratio for oval face shape, the first ratio is not in the range of the predetermine ratio for symmetry, and the second ratio is in range of a predetermined ratio for rhombic face shape; and
 rectangular face shape detection module for identifying the face shape as a rectangular face shape when the first ratio is not in the range of the predetermined ratio for oval face shape, the first ratio is not in the range of the predetermine ratio for symmetry, the second ratio is not in the range of the predetermined ratio for inverse triangular face shape, and the second ratio is not in the range of the predetermined ratio for rhombic face shape;
 wherein the information creation module is configured to create information of a rhombic face shape based on the determined rhombic face shape and a rectangular face contour defining line based on the determined rectangular face shape; and wherein the display module is configured to show information of the rhombic face contour defining line or the rectangular face contour defining line.

8. A method of detecting face shape by using a body information analysis apparatus, comprising the steps of:
 (a) activating an image fetching module of the body information analysis apparatus to record an external image;
 (b) activating a processing unit of the body information analysis apparatus for positioning two eyebrows, a mouth and two first contour features at a face contour in response to identify a face in the external image recorded by the image fetching module wherein the first contour features are disposed at two sides of the face respectively and have an elevation the same as that of the mouth;
 (c) calculating a vertical distance between the mouth and either eyebrow and taking the vertical distance as a first distance, and calculating a horizontal distance between the first contour features and taking the horizontal distance as a second distance;
 (d) calculating a first ratio of the first distance to the second distance; and
 (e) determining a face shape based on the first ratio, and showing information of the determined face shape on a display module.

9. The method as claimed in claim 8, wherein step (b) is performed by identifying an eyebrow tail feature at one of the eyebrows, a mouth corner feature at the mouth, a lower lip feature at the mouth, and the first contour features of the face; the first contour features having an elevation the same as the lower lip feature; and wherein step is performed by calculating a vertical distance between the eyebrow tail feature and the mouth corner feature and taking the vertical distance as the first distance.

10. The method as claimed in claim 8, wherein step (e) comprises the sub-steps of:
 (e11) identifying the face shape as an oval face shape when the first ratio is in range of a predetermined ratio for the oval face shape and drawing a defining line of the oval face contour based on the size of the face;
 (e12) calculating a location of the oval face shape based on a location of the face; and
 (e13) showing the external image and showing the defining line of the oval face contour at the location of the oval face shape so that the defining line of the oval face contour surrounds the face.

11. The method as claimed in claim 8, wherein step (e) comprises the sub-steps of:
 (e21) activating the processing unit to position a plurality of second contour features and a plurality of third contour features both at one cheek of the face contour wherein the plurality of the second contour features are partially overlapped the plurality of third contour features;
 (e22) calculating a first cheek angle of a first cheek tangent formed by the second contour features with respect to a second cheek tangent formed by the third contour features;
 (e23) identifying the face shape as a square face shape when the first ratio is in range of a predetermined ratio for symmetry and the first cheek angle is greater than a predetermined angle for square face shape, and showing information of the square face shape on the display module wherein the predetermined ratio for symmetry is less than a predetermined ratio for oval face shape; and
 (e24) identifying the face shape as a circular face shape when the first ratio is in the range of the predetermined ratio for symmetry and the first cheek angle is not greater than the predetermined angle for square face shape, and showing information of the circular face shape on the display module.

12. The method as claimed in claim 8, wherein step (e) comprises the sub-steps of:
 (e31) activating the processing unit to position a plurality of second contour features, a plurality of third contour features, a plurality of fourth contour features, and a plurality of fifth contour features all at one cheek of the face contour wherein the plurality of the second contour features are partially overlapped the plurality of third contour features, the plurality of the third contour features are partially overlapped the plurality of fourth contour features, and the plurality of the fourth contour features are partially overlapped the plurality of fifth contour features;
 (e32) calculating a first cheek angle of a first cheek tangent formed by the second contour features with respect to a second cheek tangent formed by the third contour features;
 (e33) calculating a second cheek angle of a third cheek tangent formed by the fourth contour features with respect to a fourth cheek tangent formed by the fifth contour features;
 (e34) identifying the face shape as a square face shape when the first ratio is in range of a predetermined ratio for symmetry and the first cheek angle or the second cheek angle is greater than a predetermined angle for square face shape, and showing information of the square face shape on the display module wherein the predetermined ratio for symmetry is less than a predetermined ratio for oval face shape; and (e35) identifying the face shape as a circular face shape when the first ratio is in the range of the predetermined ratio for symmetry and both the first cheek angle and the second cheek angle are not greater than the predetermined angle for square face shape wherein the display module is configured to show information of the circular face shape.

13. The method as claimed in claim 8, wherein step (e) comprises the sub-steps of:
   (e41) activating the processing unit to position the forehead of the face and a plurality of sixth contour features at two bone cheeks of the face contour respectively wherein the plurality of the sixth contour features are at an elevation the same as that of either eye;
   (e42) calculating a horizontal distance between two ends of the forehead of the face and taking the horizontal distance as a third distance, and calculating a horizontal distance between the sixth contour features and takes the horizontal distance as a fourth distance;
   (e43) calculating a second ratio of the third distance to the fourth distance; and
   (e44) identifying the face shape as an inverse triangular face shape when the first ratio is not in range of a predetermined ratio for oval face shape, the first ratio is not in range of a predetermined ratio for symmetry, and the second ratio is in range of a predetermined ratio for inverse triangular face shape wherein the display module is configured to show information of the inverse triangular face shape.

14. The method as claimed in claim 13, wherein step (e41) is performed by identifying two forehead features at two sides of a forehead respectively, a lower eye feature on lower edges of the eyes, and the sixth contour features having an elevation the same as that of the lower eye feature; and wherein step (e43) is performed by calculating a horizontal distance between the forehead features of the forehead and taking the horizontal distance as the third distance.

15. The method as claimed in claim 13, wherein after step (e43) step (e) further comprises the sub-steps of:
   (e45) identifying the face shape as a rhombic face shape when the first ratio is not in the range of the predetermined ratio for oval face shape, the first ratio is not in the range of a predetermine ratio for symmetry, and the second ratio is in range of a predetermined ratio for rhombic face shape, and showing information of the rhombic face shape on the display module wherein the predetermined ratio for rhombic face shape is less than the predetermined ratio for inverse triangular face shape; and
   (e46) identifying the face shape as a rectangular face shape when the first ratio is not in the range of the predetermined ratio for oval face shape, the first ratio is not in the range of the predetermine ratio for symmetry, the second ratio is not in the range of the predetermined ratio for inverse triangular face shape, and the second ratio is not in the range of the predetermined ratio for rhombic face shape; and showing information of the rectangular face shape on the display module.

\* \* \* \* \*